US009405662B2

(12) United States Patent
Ivankovic et al.

(10) Patent No.: US 9,405,662 B2
(45) Date of Patent: Aug. 2, 2016

(54) PROCESS FOR DISPLAYING TEST COVERAGE DATA DURING CODE REVIEWS

(71) Applicant: GOOGLE INC., Mountain View, CA (US)

(72) Inventors: Marko Ivankovic, Zürich (CH); Viola Katalin Petra, Zürich (CH); Pawel Marciniak, Zürich (CH)

(73) Assignee: GOOGLE INC., Mountain View, CA (US)

(*) Notice: Subject to any disclaimer, the term of this patent is extended or adjusted under 35 U.S.C. 154(b) by 40 days.

(21) Appl. No.: 14/132,902

(22) Filed: Dec. 18, 2013

(65) Prior Publication Data
US 2015/0169431 A1    Jun. 18, 2015

(51) Int. Cl.
*G06F 9/44*      (2006.01)
*G06F 11/36*    (2006.01)

(52) U.S. Cl.
CPC .................................. *G06F 11/3676* (2013.01)

(58) Field of Classification Search
CPC .................................................. G06F 11/3676
USPC ........................................................ 717/124
See application file for complete search history.

(56) References Cited

U.S. PATENT DOCUMENTS

| | | | |
|---|---|---|---|
| 5,673,387 A | 9/1997 | Chen et al. | |
| 6,895,577 B1* | 5/2005 | Noble .................. | G06F 11/3676 717/125 |
| 7,437,717 B1* | 10/2008 | Cowan et al. .................. | 717/131 |
| 8,205,191 B1* | 6/2012 | Kolawa .................. | G06F 11/368 717/124 |
| 8,276,123 B1* | 9/2012 | Deng et al. ..................... | 717/125 |
| 8,635,598 B2* | 1/2014 | Roberts ..................... | G06F 8/33 717/125 |
| 8,694,958 B1* | 4/2014 | Potter ....................... | G06F 8/35 717/125 |
| 2006/0277439 A1* | 12/2006 | Davia ................... | G06F 11/3676 714/38.1 |
| 2007/0028218 A1* | 2/2007 | Masser ............... | G06F 11/3636 717/124 |
| 2008/0148225 A1* | 6/2008 | Sarkar et al. ................... | 717/107 |
| 2009/0138855 A1* | 5/2009 | Huene et al. ................... | 717/125 |
| 2009/0249298 A1 | 10/2009 | Blount et al. | |
| 2010/0146340 A1* | 6/2010 | Bhate ................... | G06F 11/3676 714/38.14 |
| 2010/0235809 A1* | 9/2010 | Rath ......................... | G06F 8/20 717/105 |

(Continued)

OTHER PUBLICATIONS

Roy, "Review of code and solution verification procedures for computational simulation", Dec. 2004, Elsevier Inc.*

(Continued)

*Primary Examiner* — Wei Zhen
*Assistant Examiner* — Junchun Wu
(74) *Attorney, Agent, or Firm* — Birch, Stewart, Kolasch & Birch, LLP (57) ABSTRACT

Provided are methods and systems for monitoring code changes sent for review during the code review process, and performing test coverage calculations on the code changes to generate corresponding test coverage data. A code coverage service monitors code changes input to a code review system and automatically performs test coverage calculations on any code change determined to have significantly evolved as a result of the code review process. The code coverage service provides a notification of the resulting test coverage data (e.g., test coverage number) to various users and/or systems associated with the code change, including the code reviewer, the author of the code, the code review system, other notification systems, and/or any combination thereof. The test coverage data can be utilized in a comprehensive assessment of the code health of the relevant code involved.

18 Claims, 4 Drawing Sheets

(56) References Cited

U.S. PATENT DOCUMENTS

| | | | |
|---|---|---|---|
| 2011/0004867 A1* | 1/2011 | Holden | G06F 11/3676 717/127 |
| 2011/0276354 A1 | 11/2011 | Bijani et al. | |
| 2012/0167059 A1 | 6/2012 | Kosuda | |
| 2012/0222014 A1* | 8/2012 | Peretz et al. | 717/125 |
| 2012/0260230 A1 | 10/2012 | Choudhary et al. | |
| 2013/0085741 A1 | 4/2013 | Segall et al. | |
| 2013/0254746 A1 | 9/2013 | Balakrishnan et al. | |
| 2014/0096113 A1* | 4/2014 | Kuehlmann et al. | 717/126 |
| 2014/0129878 A1* | 5/2014 | Saltzman | H04L 67/2804 714/38.1 |
| 2014/0196010 A1* | 7/2014 | Balachandran | G06F 8/71 717/124 |
| 2015/0161028 A1* | 6/2015 | Chan | G06F 11/3676 717/130 |

OTHER PUBLICATIONS

Zhu et al. "Software Unit Test Coverage and Adequacy", Dec. 1997, ACM.*

Rothermel et al. "Prioritizing Test Cases for Regression Testing", Oct. 2001, IEEE, vol. 27, No. 10.*

* cited by examiner

PROCESS FOR DISPLAYING TEST COVERAGE DATA DURING CODE REVIEWS

BACKGROUND

During program code reviews, understanding whether or not a specific piece of code is covered by tests can take considerable time and effort on the part of the engineer reviewing the code. The engineer needs to read both the code being tested and the tests, follow the code execution paths, and determine for each line of code whether or not it is executed. Such a process is not only difficult but also prone to error.

Alternatively, the code reviewer can ask the author of the code change to manually run one of the existing code-coverage calculators and report the results manually to the reviewer. Because this process involves at least two people performing manual steps, it can have a significant waiting period, especially if the reviewer and the author of the code change are geographically distant from one another.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for providing automated services to users. More specifically, aspects of the present disclosure relate to an automated service for providing users with test coverage information for computer code changes made during the code review process.

One embodiment of the present disclosure relates to a computer-implemented method for providing test coverage data for a code change, the method comprising: detecting an incoming code change to a code review system; performing one or more test coverage calculations for the incoming code change; generating test coverage data for the code change based on the one or more test coverage calculations performed; and sending a notification of the test coverage data generated for the code change to at least one recipient associated with the code change.

In another embodiment, the method for providing test coverage data further comprises monitoring the code review system for notifications about changes in a code client, and detecting the incoming code change based on a received notification about a change in the code client.

In another embodiment, the method for providing test coverage data further comprises determining that a test coverage calculation was performed for a previous version of the incoming code change, and performing one or more updated test coverage calculations for the incoming code change based on a determination that the incoming code change differs from the previous version of the code change.

In yet another embodiment, the method for providing test coverage data further comprises comparing a snapshot of the incoming code change to a snapshot of the previous version of the code change, and determining, based on the comparison, that the incoming code change differs from the previous version of the code change in at least one of the following ways: one or more new tests have been added to the code change; one or more tests have been removed from the code change; more than a threshold amount of new code, other than test code, has been added to the code change; and more than a threshold amount of code, other than test code, has been removed from the code change.

In still another embodiment, the method for providing test coverage data further comprises: receiving a request for updated test coverage calculations for a code change submitted to the code review system, wherein the request for updated test coverage calculations is received prior to detection of the submitted code change; and performing one or more updated test coverage calculations for the submitted code change in response to the request.

Another embodiment of the present disclosure relates to a system for providing test coverage data for a code change, the system comprising one or more processors and a non-transitory computer-readable medium coupled to the one or more processors having instructions stored thereon that, when executed by the one or more processors, cause the one or more processors to perform operations comprising: detecting an incoming code change to a code review service; performing one or more test coverage calculations for the incoming code change; generating test coverage data for the code change based on the one or more test coverage calculations performed; and sending a notification of the test coverage data generated for the code change to at least one recipient associated with the code change.

In another embodiment, the one or more processors in the system for providing test coverage data are caused to perform further operations comprising monitoring the code review service for notifications about changes in a code client, and detecting the incoming code change based on a received notification about a change in the code client.

In yet another embodiment, the one or more processors in the system for providing test coverage data are caused to perform further operations comprising determining that a test coverage calculation was performed for a previous version of the incoming code change, and performing one or more updated test coverage calculations for the incoming code change based on a determination that the incoming code change differs from the previous version of the code change.

In yet another embodiment, the one or more processors in the system for providing test coverage data are caused to perform further operations comprising comparing a snapshot of the incoming code change to a snapshot of the previous version of the code change, and determining, based on the comparison, that the incoming code change differs from the previous version of the code change in at least one of the following ways: one or more new tests have been added to the code change; one or more tests have been removed from the code change; more than a threshold amount of new code, other than test code, has been added to the code change; and more than a threshold amount of code, other than test code, has been removed from the code change.

In still another embodiment, the one or more processors in the system for providing test coverage data are caused to perform further operations comprising posting a notification in a notification area of a user interface screen associated with the code review service, wherein the posted notification is accessible by the at least one recipient associated with the code change.

In yet another embodiment, the one or more processors in the system for providing test coverage data are caused to perform further operations comprising receiving a request for updated test coverage calculations for a code change submitted to the code review service, wherein the request for updated test coverage calculations is received prior to detection of the submitted code change, and performing one or more updated test coverage calculations for the submitted code change in response to the request.

Yet another embodiment of the present disclosure relates to one or more non-transitory computer readable media storing computer-executable instructions that, when executed by one or more processors, causes the one or more processors to perform operations comprising: monitoring a code review system for notifications about changes in a code client; detecting an incoming code change to the code review system based on a received notification about a change in the code client; performing one or more test coverage calculations for the incoming code change; generating test coverage data for the code change based on the one or more test coverage calculations performed; and sending a notification of the test coverage data generated for the code change to at least one recipient associated with the code change.

In one or more other embodiments, the methods and systems described herein may optionally include one or more of the following additional features: the determination that a test coverage calculation was performed for a previous version of the incoming code change is based on a code change identifier associated with both the incoming code change and the previous version of the incoming code change; the determination that the incoming code change differs from the previous version of the code change is based on a comparison of a snapshot of the incoming code change to a snapshot of the previous version of the code change; the at least one recipient associated with the code change includes at least one of an author of the code change, a reviewer of the code change, and a code review service through which the code change may be accessed; and/or sending a notification of the test coverage data generated for the code change includes posting a notification in a notification area of a user interface screen associated with the code review system, wherein the posted notification is accessible by the at least one recipient associated with the code change.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for monitoring computer code changes sent for review during the code review process and performing test coverage calculations on the code changes to generate corresponding test coverage data for the code changes. As will be described in greater detail herein, a central monitoring service may generate test coverage data for a code change input to a code review system, and provide such test coverage data to one or more users and/or systems associated with the particular code change. For example, in accordance with at least one embodiment described herein, the service may provide (e.g., send, make available, etc.) test coverage data generated for a code change to an author of the code change, a reviewer of the code change, a notification component of the code review system, and/or any combination thereof. The test coverage data generated for a code change may be utilized by the various interested parties/systems to, for example, assess the health of the code.

As discussed above, when a code reviewer and an author of a code change are geographically-distant from one another (e.g., several time zones apart), it is often time-consuming for the code reviewer to ask the author of the code change to manually run an existing code-coverage calculator and report the results manually to the reviewer. In such geographically-distant scenarios, before the reviewer has even had a chance to view the code change, the author of the code change would benefit from the test code coverage calculation to make sure the author did not forget to test any code paths in his or her change. The author can, for example, perform the same process the reviewer would perform and manually inspect the code, which is error-prone and time-consuming, or run the coverage calculation manually, which the author may forget to do or may not be aware that such an operation is easily done.

Some existing approaches provide binary "all tests passed" or "some tests failed" information for each code change.

However, such approaches do not provide the necessary per-line resolution to address the problems described above. Other existing approaches utilize external systems that run all tests at a predetermined time. As such, these other approaches are only capable of providing retrospective information once the code change has already been incorporated into the code.

Accordingly, embodiments of the present disclosure relate to methods and systems for automatically providing code change test coverage information at scale. As will be described in greater detail below, test coverage calculations may be automatically performed on any code change determined to have significantly evolved over a period of time. In accordance with at least one embodiment, a new code change may be determined to be significant enough to warrant the performance of new/updated test coverage calculations where a snapshot of the new code change differs from a snapshot of the previously tested code change in at least one of the following example ways: (1) one or more new tests were added to the code change; (2) one or more tests have been removed from the code change; (3) more than a threshold amount (e.g., 10%) has been added code to the code change, not including test code; (4) more than a threshold amount (e.g., 10%) has been removed from the code change, not including test code; (5) any combination of (1)-(4). It should be understood that the above factors are exemplary in nature, and numerous other factors may also be considered in determining whether a new code change is "significant enough" to warrant new/updated test coverage calculations in addition to or instead of the example factors described above.

In accordance with at least one embodiment, a centralized service may be configured to monitor code changes sent for review and run one or more pre-configured collections of tests on the code changes using existing test coverage calculation tools (e.g., for the particular code language involved in the code change) known to those skilled in the art. The centralized service may then provide a notification of the resulting test coverage information (e.g., test coverage number) to the code reviewer, the author of the code, the code review system, one or more other interested parties, and/or any combination thereof. In one example, the service may provide such a notification via e-mail. In one or more other examples, the service may provide the notification in a notification area of a user interface screen associated with a code review system, by sending the notification via an instant messaging service, or by sending the test coverage data to one or more other notification systems.

In accordance with at least one embodiment described herein, the centralized service may be configured to monitor code changes by subscribing to all incoming code changes submitted to a code review system.

It should be noted that in accordance with one or more embodiments of the present disclosure the code coverage service described herein may be configured to provide users with a mechanism for manual invocation of the service. For example, in the event that a code change submitted for review (e.g., to a code review system) is not automatically detected by the code coverage service, or where there arises an urgent need for updated test coverage calculations (e.g., because of significant changes to the code change as a result of the code review process), a user associated with the code change (e.g., the author of the code change, a reviewer of the code change, etc.) may manually invoke the code coverage service to perform the various operations described herein. In accordance with at least one embodiment, users of the code review system described herein may have access to a utility program that is capable of sending notifications to the code coverage service in the same or similar way that a code review service (de-scribed in greater detail below) sends notifications when a code change is detected. Further, in accordance with at least one embodiment, a user interface screen associated with the code review service may include a selectable button that a user can select to have the code review system submit a request to the code coverage service on the user's behalf.

Once the service is made aware of a code change for the first time, the service may continue to monitor the code change in regular time intervals (e.g., hourly, daily, etc.). If the service determines that the code change has evolved significantly, the service may automatically re-run the test coverage calculation and send new coverage information. In accordance with at least one embodiment, the service may continue monitoring code changes until the changes are: (1) submitted to the code base; (2) discarded and deleted from the review system; or (3) expire due to a time out and are declared obsolete. In an example scenario where the service detects that a code change has been submitted to the code base, the service may be configured to execute a final test coverage run and calculate a final "post submit" coverage number. In such a scenario, the service may also be configured to determine the difference between the first code coverage calculation (e.g., performed by the service) and the post submit coverage calculation, and store the difference (e.g., in a database) and/or send out a notification about the difference to interested parties. In accordance with at least one embodiment, all information that may be collected by the service (e.g., test coverage results for each run of pre-configured tests for each code change) may be stored for analysis of long-term trends and overall code health.

In accordance with one or more embodiments described herein, the automated nature of the code coverage service relieves an author of a code change from having to remember to run a coverage calculation for the code change. Instead, a code reviewer of the code change may be provided with the ability to visually (and directly) determine if a particular line of code is covered by tests, and various other users/systems/etc. associated with the code change may be provided with comprehensive test coverage data (e.g., an overall test coverage number) that can be utilized to assess the code health of the relevant code. Among numerous other advantages, the code coverage service of the present disclosure reduces human error (e.g., increases accuracy of the code review process), reduces waiting time at various stages throughout the code review process (e.g., increases efficiency of the code review process), and allows for long-term cross-project analysis of code health.

Figure 1:
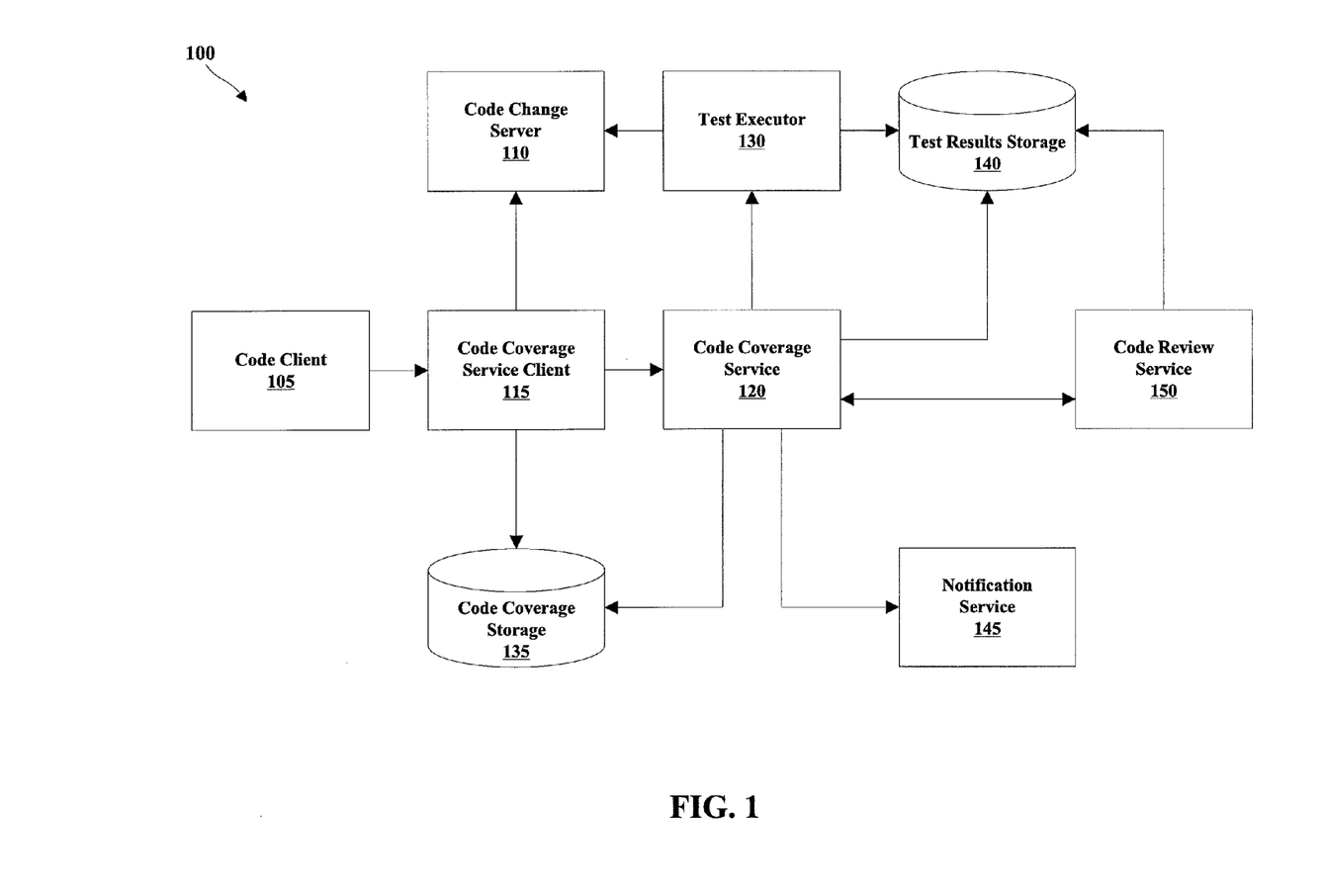
FIG. 1 is a block diagram illustrating an example system for providing test coverage data for code changes sent for review during the code review process according to one or more embodiments described herein.

FIG. 1 illustrates an example system for providing test coverage data for code changes sent for review during the code review process according to one or more embodiments described herein. The system 100 may include Code Client 105, Code Coverage Service Client 115, Code Change Server 110, Code Coverage Service 120, Test Executor 130, Code Review Service 150, and Notification Service 145. The system 100 may also include one or more databases configured to store data, such as, for example, Code Coverage Storage 135 and Test Results Storage 140.

In accordance with at least one embodiment, system 100 may be a distributed system in which each of the components comprising system 100 may be configured to run on separate machines (e.g., computers, servers, etc.). For example, Code Client 105 may run on a developer's machine (e.g., computer) while the remaining components of system 100 operate in a location accessible over a communications network shared between various users of the system 100. In addition, many Code Clients 105 may communicate to the same services (e.g., Code Coverage Service Client 115, Code Change Server 110, Code Coverage Service 120, etc.). In accordance with one or more embodiments, system 100 may be designed in a fault-tolerant manner whereby several instances of the same shared processes are run on numerous computers connected over a network.

Code Client 105 may be an application (e.g., computer software application or program) configured to manage a snapshot of source code changed by a developer.

Code Coverage Service Client 115 may be a utility program configured to notify the Code Coverage Service 120 about a code change and also generate requests for code coverage calculations when a code change is detected.

Code Change Server 110 may be a service configured to manage code snapshots and code change proposals submitted by developers.

Code Coverage Service 120 may be a service configured to monitor code change notifications received from the Code Coverage Service Client 115 and perform code coverage calculations (e.g., using one or more existing test coverage calculation tools).

Test Executor 130 may be a service configured to execute tests on any given snapshot of the code base and record the results of the test execution in, for example, Test Results Storage 140.

Code Review Service 150 may be configured to facilitate the code review process according to one or more embodiments described herein. For example, developers may utilize Code Review Service 150 to request code review, and code reviewers may submit comments on proposed code changes to the Code Review Service 150. In addition, Code Review Service 150 may include one or more tools that allow users to annotate (e.g., highlight, insert comments, show revisions, etc.) proposed code changes.

Notification Service 145 may be a service configured to generate notifications about code coverage test results (e.g., stored in Test Results Storage 140 by Test Executor 130) and send (or otherwise make available) such notifications to one or more individual users or groups of users.

In accordance with at least one embodiment described herein, example data flows between the various components of system 100 may include the following.

Code Coverage Service 120 may be configured to read code coverage data from Test Results Storage 140 for completed test executions (e.g., by Test Executor 130). For example, Code Coverage Service 120 may read data about the percentage of changed lines of code covered by one or more tests performed by Test Executor 130. In another example, Code Coverage Service 120 may read, from Test Results 140, data about a list of files that were covered by any of the tests performed by Test Executor 130.

In accordance with at least one embodiment, Code Coverage Service 120 may also be configured to both read and write data to Code Coverage Storage 135. For example, Code Coverage Service 120 may be configured to record the current state of a test coverage calculation (e.g., being performed by Code Coverage Service 120) for a given code change in Code Coverage Storage 135. In accordance with one or more other embodiments, Code Coverage Service 120 may further be configured to read such records from Code Coverage Storage 135 in order to, for example, resume execution of performing a test coverage calculation for the code change in a case of a server restart (e.g., after a failure).

Code Review Service 150 may be configured to read code coverage data from Test Results Storage 140 for completed test executions (e.g., by Test Executor 130). For example, Code Review Service 150 may read data about a list of files that were covered by any of the tests performed by Test Executor 130 and, for each of these files, the list of lines of code that were covered by the tests. In accordance with at least one embodiment described herein, Code Review Service 150 may use the data read from Test Results Storage 140 to, for example, identify and distinguish lines of code that were tested from lines of code that were not tested. For example, Code Review Service may highlight tested lines of code with a first color while highlighting untested lines of code with a second color, and then present all lines of the code (with the highlights) in a code review user interface screen (not shown) that may be presented to various users associated with the code (e.g., the code developers, code reviewers, etc.). Code Review Service 150 may also be configured to notify Code Coverage Service 120 of changes in the reviewed code.

Test Executor 130 may be configured to write data to Test Results Storage 140. In accordance with at least one embodiment, Test Executor 130 may be configured to write test logs, pass/fail information, and test coverage data (e.g., list of files that were covered by any of the tests performed by Test Executor 130 and, for each of these files, the list of lines of code that were covered by the tests) to Test Results Storage 140. For example, Test Executor may be configured to write the following example data to Test Results Storage 140:

```
test_1 PASSED
test_2 FAILED
test_3 TIMED OUT
test_4 BUILD FAILED
code_file_1:
    line 1: INSTRUMENTED, COVERED
    line 2: INSTRUMENTED, COVERED
    line 3: INSTRUMENTED, NOT COVERED
    line 4: NOT INSTRUMENTED
    ...
code_file_2:
    line 1: INSTRUMENTED, COVERED
    line 2: INSTRUMENTED, COVERED
    line 3: INSTRUMENTED, NOT COVERED
    line 4: INSTRUMENTED, COVERED
    ...
```

Code Coverage Service Client 115 may be configured to write data to Code Coverage Storage 135. In accordance with at least one embodiment, Code Coverage Service Client 115 may be configured to record the event of a code coverage calculation request (e.g., generated by Code Coverage Service Client 115 when a code change is detected, and sent to Code Coverage Service 120) in Code Coverage Storage 135. For example, when a code coverage calculation request is sent to Code Coverage Service 120, Code Coverage Service Client 115 may log various data about the request in Code Coverage Storage 135, such as a code client identifier, a code change identifier, a user name, a project configuration including a list of tests to run and file patterns to instrument, or any combination thereof. It should be understood that various other data may also be logged by Code Coverage Service Client 115 in Code Coverage Storage 135, in addition to or instead of the example data described above.

Code Client 105 may be configured to push data to Code Coverage Service Client 115. For example, Code Client 105 may be configured to send a request to Code Coverage Service Client 115, where the request relates to a particular code change and may include a project configuration including a list of tests to run and file patterns to instrument for the code change.

In accordance with at least one embodiment, in response to Code Client 105 pushing data to Code Coverage Service Client 115, Code Client 105 may receive a status (e.g., "OK", "NOT OK", etc.) from Code Coverage Service Client 115. For example, Code Client 105 may receive an "OK" status from Code Coverage Service Client 115 in response to Code Coverage Service Client 115 determining that a snapshot of source code changed by a developer was successfully uploaded to Code Change Server 110 and also that Code Coverage Service 120 has started a requested code coverage calculation for the code change. In another example, Code Client 105 may receive a "NOT OK" status from Code Coverage Service Client 115 in response to Code Coverage Service Client 115 determining that a failure occurred in either of the operations described above.

Code Coverage Service Client 115 may be configured to push data to Code Change Server 110 and Code Coverage Service 120. In accordance with at least one embodiment, Code Coverage Service Client 115 may be configured to upload a current snapshot of source code changed by a developer to Code Change Server 110. For example, Code Coverage Service Client 115 may upload the snapshot of the changed source code to Code Change Server 110 in order to make the snapshot accessible to Test Executor 130. The following is example data that may be pushed by Code Coverage Service Client 115 to Code Change Server 110:

```
<user name>
directory_1/file_1, <file1 content>
directory_1/file_2, <file2 content>
directory_2/file_3, <file3 content>
```

Code Coverage Service Client 115 may also be configured to notify Code Coverage Service 120 about a code change. In accordance with at least one embodiment, Code Coverage Service Client 115 may notify Code Coverage Service 120 about a code change by sending a request for a code coverage calculation for the code change to Code Coverage Service 120. The data that may be sent to Code Coverage Service 120 in such a request may include, for example, a code change snapshot identifier for the code change snapshot uploaded to Code Change Server 110, a code change identifier, a user name, a project configuration including a list of tests to run and file patterns to instrument, or any combination thereof. For example, a request for a code coverage calculation for a particular code change may include the following example data:

code change snapshot identifier: 12 [unique for the specific code change]

code change identifier: 12345 [unique for any code change]

user name: user_1 test patterns: directory_1/test_1, directory_2/*[specifying a single test, or a wild char pattern that should be expanded to all tests that match the pattern]

file instrumentation patterns: directory_1/*, directory_2/*

It should be understood that various other data may also be included in a request for a code coverage calculation sent from Code Coverage Service Client 115 to Code Coverage Service 120, in addition to or instead of the example data described above.

In response to the Code Coverage Service Client 115 pushing data to Code Change Server 110 and the Code Coverage Service 120, the Code Coverage Service Client 115 may receive a status (e.g., "OK" or "NOT OK" status) from each of Code Change Server 110 and the Code Coverage Service 120. For example, in response to Code Coverage Service Client 115 uploading a snapshot of source code changed by a developer to Code Change Server 110, Code Coverage Service Client 115 may receive an "OK" status from Code Change Server 110 if the source code snapshot was successfully uploaded. In accordance with at least one embodiment, Code Coverage Service Client 115 may receive an "OK" status from Code Change Server 110 together with a code change snapshot identifier uploaded to Code Change Server 110. In another example, in response to Code Coverage Service Client 115 uploading a source code snapshot to Code Change Server 110, Code Coverage Service Client 115 may receive a "NOT OK" status from Code Change Server 110 if the source code snapshot failed to upload properly or completely to Code Change Server 110. In yet another example, in response to Code Coverage Service Client 115 sending a request for a code coverage calculation to Code Coverage Service 120, Code Coverage Service Client 115 may receive a "NOT OK" status from Code Coverage Service 120 if, for example, Code Coverage Service 120 failed to start the requested code coverage calculation.

In accordance with one or more embodiments described herein, if Code Coverage Service Client 115 receives a "NOT OK" status from either of Code Change Server 110 and Code Coverage Service 120, Code Coverage Service Client 115 may be configured to abort the operation being performed (e.g., uploading a source code snapshot to Code Change Server 110 or requesting a code coverage calculation from Code Coverage Service 120) and log a failure event in Code Coverage Storage 135. The failure event that may be logged in Code Coverage Storage 135 by Code Coverage Service Client 115 may include, for example, data about the particular failure such as the operation attempted, the source code change involved, timestamp information, and the like. In at least one example, the data logged in Code Coverage Storage 135 may be used for various system 100 debugging purposes.

Code Coverage Service 120 may be configured to request test execution for a particular code change from the Test Executor 130. In accordance with at least one embodiment, the request that may be sent from Code Coverage Service 120 to Test Executor 130 may include data similar to the data included in a request for a code coverage calculation sent from Code Coverage Service Client 115 to Code Coverage Service 120, as described above. For example, the request that may be sent from Code Coverage Service 120 to Test Executor 130 may contain a subset of the data from the code coverage calculation request received at Code Coverage Service 120 including, for example, the code change snapshot identifier uploaded to Code Change Server 110, and the project configuration including the list of tests to run and file patterns to instrument.

Test Executor 130 may be configured to read a snapshot of source code changed by a developer from Code Change Server 110. For example, Test Executor 130 may read a code change stored (e.g., Code Coverage Service Client 115) on Code Change Server 110 in order to execute tests on the code change.

Test Executor 130 may also be configured to report a status to Code Coverage Service 120 based on the outcome of the tests executed by Test Executor 130 for a particular code change. For example, in response to Text Executor 130 determining that all tests passed for a code change, Test Executor 130 may send an "OK" status to Code Coverage Service 120. In another example, Test Executor 130 may send a "NOT OK" status to Code Coverage Service 120 in response to Test Executor 130 determining that one or more tests failed for the code change or that the requested tests could not be executed for the code change. In accordance with at least one embodiment, Code Coverage Service 120 may record the status received from Test Executor 130 in Code Coverage Storage 135.

Code Coverage Service 120 may be configured to request e-mail generation and transmission through Notification Service 145. For example, Code Coverage Service 120 may request that Notification Service 145 send an e-mail (e.g., to one or more authorized or designated recipients) containing a report of a code change for which test execution has been performed (e.g., by Test Executor 130) and an overall code coverage calculation (e.g., percentage) determined therefrom. In accordance with at least one embodiment, in response to sending a request for e-mail notification to Notification Service 145, Code Coverage Service 120 may receive a status report from Notification Service 145. For example, Code Coverage Service 120 may receive an "OK" status from Notification Service 145 if the requested e-mail was successfully sent by Notification Service 145, and may receive a "NOT OK" status if the requested e-mail could not be sent by Notification Service 145. In accordance with at least one embodiment, Code Coverage Service 120 may record the status received from Notification Service 145 in Code Coverage Storage 135.

In accordance with one or more embodiments, Code Coverage Service 120 may also be configured to push code coverage data (e.g., code coverage calculation based on the test results received from Test Executor 130) to Code Review Service 150 for display in a notification area of a user interface screen associated with Code Review Service 150. For example, Code Coverage Service 120 may be configured to generate a summary of code coverage results for a particular code change and post the summary in the notification area of the user interface screen associated with Code Review Service 150.

Figure 2:
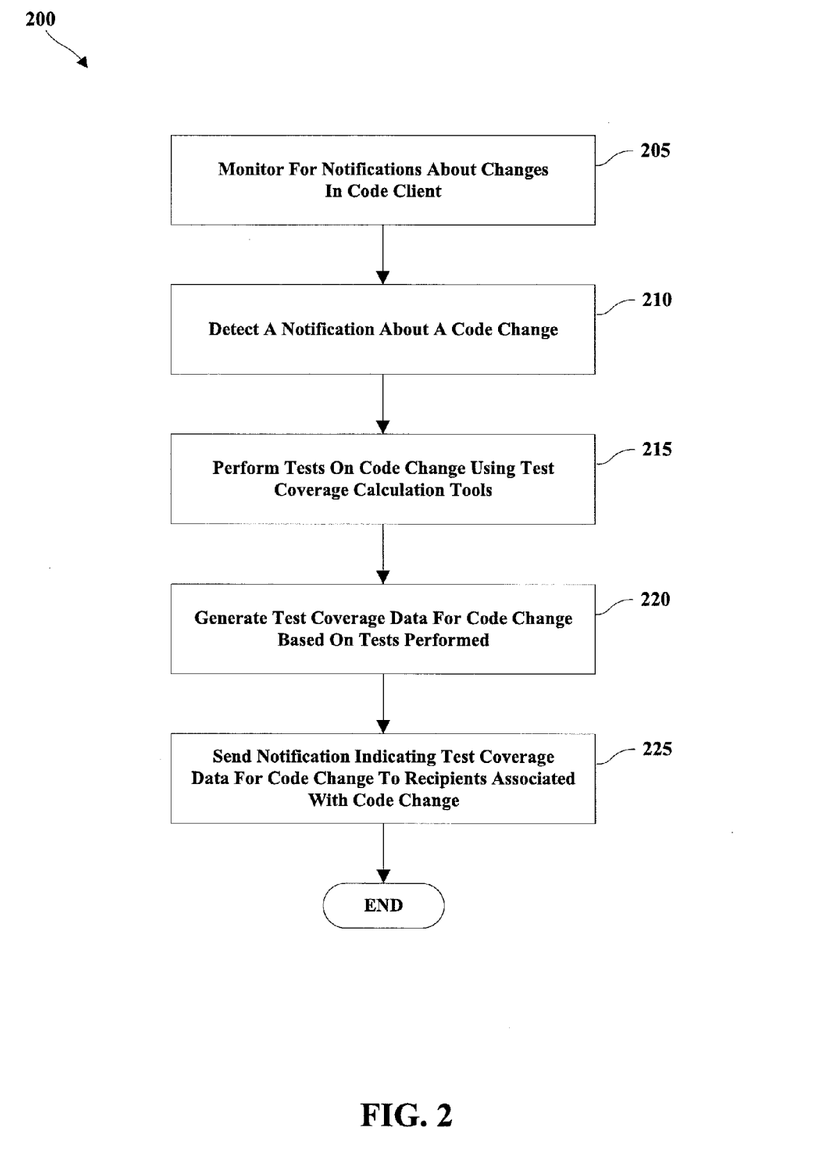
FIG. 2 is a flowchart illustrating an example method for monitoring code changes input to a code review system and performing test coverage calculations on the code changes to generate corresponding test coverage data for the code changes according to one or more embodiments described herein.

FIG. 2 illustrates an example process for monitoring code changes input to a code review system and performing test coverage calculations on the code changes to generate corresponding test coverage data for the code change. In accordance with at least one embodiment, the process 200 may be performed by a distributed system (e.g., system 100 shown in FIG. 1) configured to run on one or more servers.

At block 205, a program may be monitored for notifications about changes in a code client. For example, a code coverage service may be configured to monitor a utility program for notifications about a source code change made by a developer (e.g., Code Coverage Service 120 may monitor notifications received from Code Coverage Service Client 115 about code changes submitted through Code Client 105 in the example system 100 shown in FIG. 1). In accordance with at least one embodiment, the notifications monitored at block 205 may be notifications generated from a utility program configured to receive code change requests from an application managing a snapshot of source code being worked on by a developer.

At block 210, a notification about a code change may be detected based on the monitoring performed at block 205. For example, a code coverage service may detect a code change based on a notification received from a code coverage service client (e.g., Code Coverage Service 120 may detect a code change based on a notification received from Code Coverage Service Client 115 in the example system 100 shown in FIG. 1).

At block 215, one or more tests may be performed for the code change detected at block 210. For example, one or more coverage tests may be performed (e.g., by Test Executor 130 in the example system 100 shown in FIG. 1) on the code change using test coverage calculation tools known to those skilled in the art.

At block 220, test coverage data (e.g., code coverage calculations) may be generated for the code change based on the tests performed at block 215. In accordance with at least one embodiment, a code coverage service may utilize the results obtained from the tests performed on the code change at block 215 to generate a code coverage calculation (e.g., a percentage) for the code change (e.g., Code Coverage Service 120 may utilize results obtained from Test Executor 130 to generate a code coverage calculation, in the example system 100 shown in FIG. 1).

At block 225, a notification may be sent to one or more recipients (e.g., users, systems, services, etc.) associated with the code change where the notification indicates or includes the test coverage data generated at block 220. For example, at block 225 an e-mail may be sent to one or more authorized or designated recipients where the e-mail contains a report of the code change for which tests were performed at block 215, together with an overall code coverage calculation determined at block 220 based on the results of the tests. In accordance with at least one embodiment, the notification that may be sent at block 225 may be a posting of a summary of code coverage results for the code change in a notification area of a user interface screen associated with a code review service (e.g., Code Review Service 150 in the example system 100 shown in FIG. 1).

Figure 3:
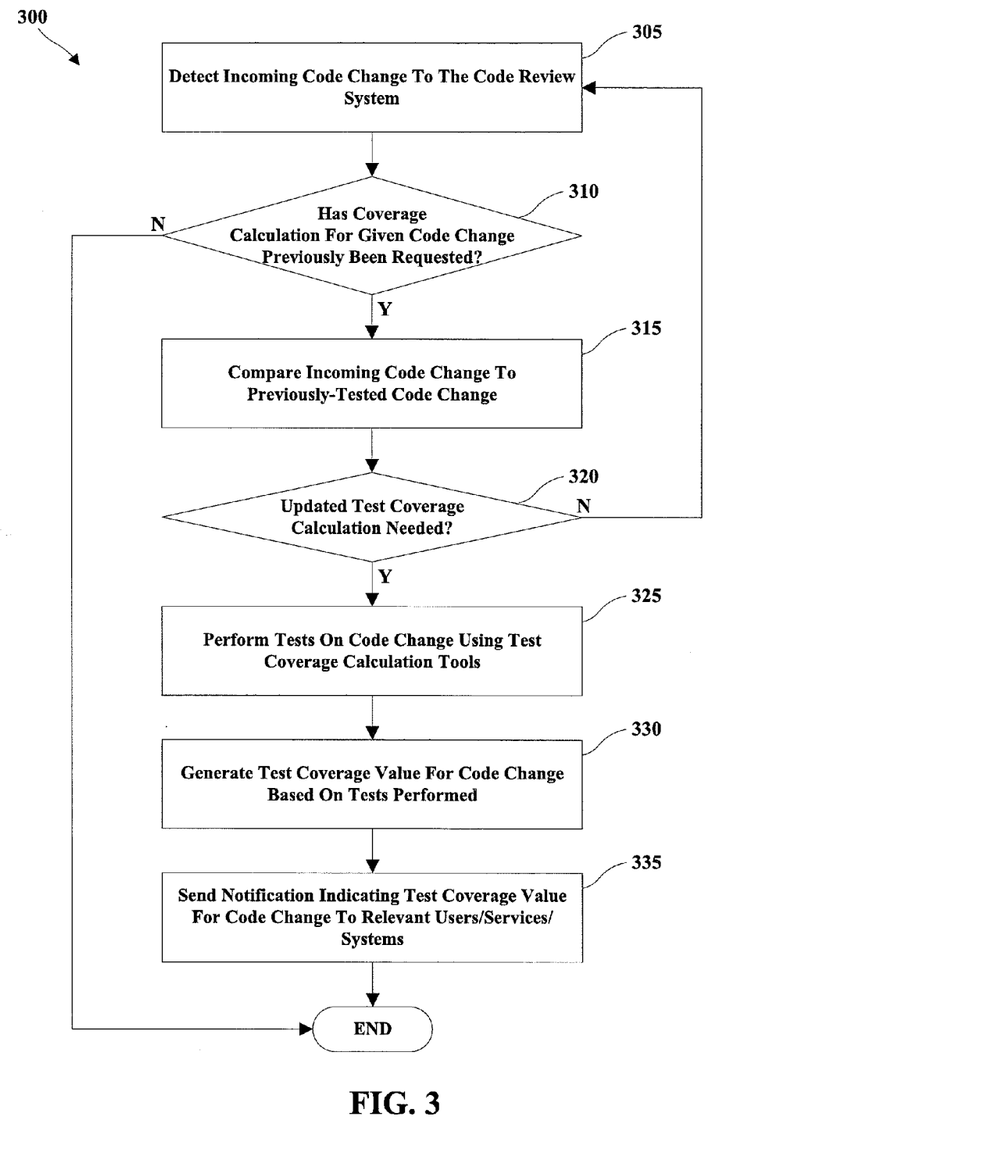
FIG. 3 is a flowchart illustrating an example method for detecting a new code change input to a code review system, monitoring progression of the code change, and performing updated test coverage calculations on the code change based on the monitored progression of the code change according to one or more embodiments described herein.

FIG. 3 illustrates an example process for detecting a new code change input to a code review system, monitoring changes to the code change (e.g., as a result of the code review process), and performing updated test coverage calculations on the code change based on the changes made to the code change (e.g., the evolution of the code change) according to one or more embodiments described herein. In accordance with at least one embodiment, the process 300 may be performed by a distributed system (e.g., system 100 shown in FIG. 1) configured to run on one or more servers.

At block 305, an incoming code change to a code review system may be detected. For example, a developer may submit a source code change (e.g., for review and/or approval) to a code review system, and this submission may be detected by a component of the system (e.g., a code change made by a developer in Client Code 105 may be detected by Code Coverage Service 120 based on a notification generated by Code Coverage Service Client 115 in the example system 100 shown in FIG. 1).

At block 310, a determination may be made as to whether a coverage calculation (e.g., test coverage measurement) has previously been requested for the incoming code change detected at block 305. In accordance with at least one embodiment, the determination at block 310 may be made based on various data associated with the incoming code change. For example, the code change detected at block 305 may include a code client identifier, a code change identifier, a user name, a project configuration including a list of tests to run and file patterns to instrument, or any combination thereof. The data associated with the code change may be used, for example, to determine whether any coverage test results are stored for the code change (e.g., in Test Results Storage 140 in the example system 100 shown in FIG. 1).

If it is determined at block 310 that a coverage measurement has not previously been requested for the incoming code change, the process may end. In accordance with at least one embodiment, if is determined at block 310 that no coverage measurement currently exists for the code change (e.g., in Test Results Storage 140 in the example system 100 shown in FIG. 1), test coverage calculations may be performed for the code change to generate corresponding test coverage data for the code change in accordance with the example process 200 described above and illustrated in FIG. 2.

On the other hand, if it is determined at block 305 that a coverage measurement has previously been requested for the incoming code change, then at block 315 the incoming code change may be compared to the previous code change already tested for coverage. For example, at block 315 a snapshot of the incoming code change (e.g., provided by Code Client 105 to Code Coverage Service Client 115 in the example system 100 shown in FIG. 1) may be compared to a snapshot of the previously tested code change (e.g., stored in Code Change Server 110 in the example system 100 shown in FIG. 1) to determine an extent to which the code change has been modified.

Based on the comparison performed at block 315, a determination may be made at block 320 as to whether updated test coverage calculations (measurements) are needed for the code change. In accordance with at least one embodiment, the determination that may be made at block 320 may be based on the extent the code change has evolved (e.g., has been modified or revised) from the version previously tested for and the version detected at block 305. For example, a new code change may be determined to be significant enough to warrant the performance of new/updated test coverage calculations where a snapshot of the new code change differs from a snapshot of the previously tested code change in at least one of the following example ways: (1) one or more new tests were added to the code change; (2) one or more tests have been removed from the code change; (3) more than a threshold amount (e.g., 10%) has been added code to the code change, not including test code; (4) more than a threshold amount (e.g., 10%) has been removed from the code change, not including test code; (5) any combination of (1)-(4). It should be understood that numerous other factors may also be considered in determining at block 320 whether a new version of a code change detected at block 305 is "significant enough" to warrant new/updated test coverage calculations, in addition to or instead of the example factors described above.

If it is determined at block 320 that an updated test coverage calculation is not needed for the particular code change, the process may return to block 305 and repeat. On the other hand, if it is determined at block 320, based on the comparison performed at block 315, that the code change has evolved enough to warrant an updated coverage calculation, the process may move to block 325.

In accordance with at least one embodiment, remaining blocks 325, 330, and 335 in the example process 300 may include operations similar to the operations of blocks 215, 220, and 225, respectively, in the example process 200 described in detail above and illustrated in FIG. 2. Therefore, for purposes of brevity, the operations of blocks 325, 330, and 335 in the example process 300 will not be further described.

Figure 4:
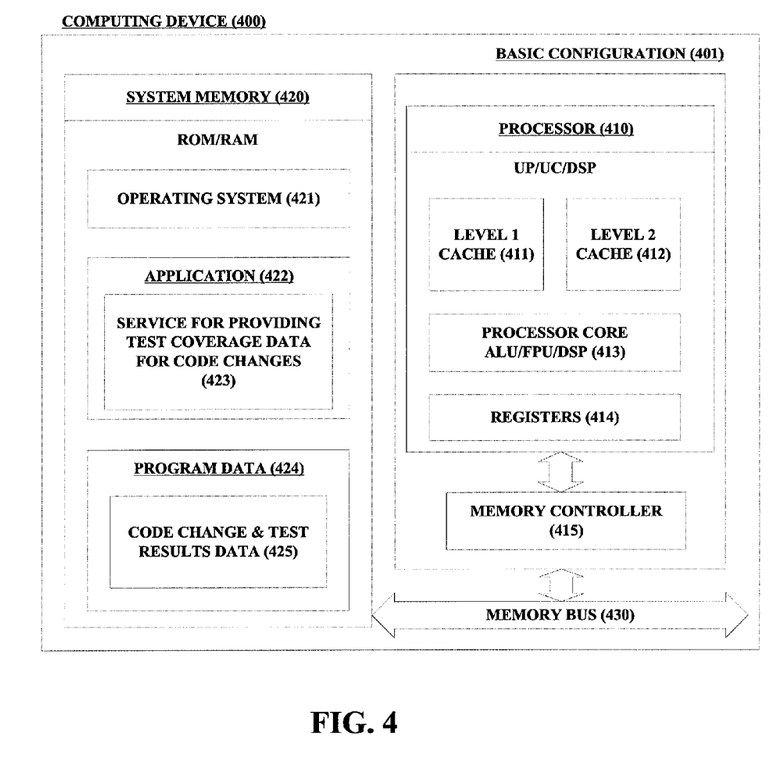
FIG. 4 is a block diagram illustrating an example computing device arranged for monitoring code changes input to a code review system and performing test coverage calculations on the code changes to generate corresponding test coverage data for the code changes according to one or more embodiments described herein.

FIG. 4 is a high-level block diagram of an exemplary computer (400) arranged for monitoring code changes input to a code review system and performing test coverage calculations on the code changes to generate corresponding test coverage data for the code changes according to one or more embodiments described herein. In a very basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (µP), a microcontroller (µC), a digital signal processor (DSP), or any combination thereof. The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof. A memory controller (416) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) may include a service (423) for providing test coverage data for code changes (e.g., for code changes submitted to a code review system, such as the example code review system 100 shown in FIG. 1). Program Data (424) may include storing instructions that, when executed by the one or more processing devices, implement a service for providing test coverage data for code changes. Additionally, in accordance with at least one embodiment, program data (424) may include code change and test results data (425), which may include data about one or more changes made to a code change as a result of the code review process, as well as data about test coverage calculations performed on the code change (e.g., by the service (423) for providing test coverage data for code changes). In some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for providing test coverage data for a code change, said method comprising:
    detecting an incoming code change submitted to a code review system;
    comparing the incoming code change to a previous version of the incoming code change previously submitted to the code review system;
    determining, based on the comparison, an extent to which the incoming code change has been modified from the previous version of the incoming code change previously submitted to the code review system;
    in response to the determined extent of the modification satisfying a threshold, performing one or more test coverage calculations for the incoming code change;
    in response to the extent of the modification not satisfying the threshold, maintaining a test coverage calculation performed for the previous version of the incoming code change previously submitted to the code review system;
    generating test coverage data for the incoming code change based on the one or more test coverage calculations performed or the test coverage calculation performed for the previous version of the incoming code change; and
    sending a notification of the generated test coverage data generated for the code change to at least one recipient associated with the code change.

2. The computer-implemented method of claim 1, wherein the detection of the incoming code change is based on a notification generated in response to the code change being submitted to the code review system.

3. The computer-implemented method of claim 1, further comprising:
    determining that a test coverage calculation was performed for the previous version of the incoming code change; and
    determining, based on the comparison, that the incoming code change differs from the previous version of the code change,
    wherein the one or more test coverage calculations performed for the incoming code change are based on the determination that the incoming code change differs from the previous version of the code change.

4. The computer-implemented method of claim 3, wherein the determination that a test coverage calculation was performed for a previous version of the incoming code change is based on a code change identifier associated with both the incoming code change and the previous version of the incoming code change.

5. The computer-implemented method of claim 3, wherein the determination that the incoming code change differs from the previous version of the code change is based on a comparison of a snapshot of the incoming code change to a snapshot of the previous version of the code change.

6. The computer-implemented method of claim 3, further comprising:
    comparing a snapshot of the incoming code change to a snapshot of the previous version of the code change; and
    determining, based on the comparison, that the incoming code change differs from the previous version of the code change in at least one of the following ways: one or more new tests have been added to the code change; one or more tests have been removed from the code change; more than a threshold amount of new code, other than test code, has been added to the code change; and more than a threshold amount of code, other than test code, has been removed from the code change.

7. The computer-implemented method of claim 1, wherein sending a notification of the test coverage data generated for the code change includes posting a notification in a notification area of a user interface screen associated with the code review system, wherein the posted notification is accessible by the at least one recipient associated with the code change.

8. The computer-implemented method of claim 1, further comprising:
    prior to detecting the incoming code change, receiving a request for updated test coverage calculations for a code change already submitted to the code review system; and
    performing one or more updated test coverage calculations for the already submitted code change in response to the request.

9. A system for providing test coverage data for a code change, said system comprising:
    one or more processors; and
    a non-transitory computer-readable medium coupled to said one or more processors having instructions stored thereon that, when executed by said one or more processors, cause said one or more processors to perform operations comprising:
    detecting an incoming code change submitted to a code review service;
    comparing the incoming code change to a previous version of the incoming code change previously submitted to the code review service;

determining, based on the comparison, an extent to which the incoming code change has been modified from the previous version of the incoming code change previously submitted to the code review service;

in response to the determined extent of the modification satisfying a threshold, performing one or more test coverage calculations for the incoming code change;

in response to the extent of the modification not satisfying the threshold, maintaining a test coverage calculation performed for the previous version of the incoming code change previously submitted to the code review system;

generating test coverage data for the incoming code change based on the one or more test coverage calculations performed or the test coverage calculation performed for the previous version of the incoming code change; and sending a notification of the generated test coverage data generated for the code change to at least one recipient associated with the code change.

10. The system of claim 9, wherein the one or more processors are caused to perform further operations comprising:
receiving a notification generated in response to the code change being submitted to the code review service, wherein the detection of the incoming code change is based on the received notification.

11. The system of claim 9, wherein the one or more processors are caused to perform further operations comprising:
determining that a test coverage calculation was performed for the previous version of the incoming code change; and
determining, based on the comparison, that the incoming code change differs from the previous version of the code change,
wherein the one or more test coverage calculations performed for the incoming code change are based on the determination that the incoming code change differs from the previous version of the code change.

12. The system of claim 11, wherein the determination that a test coverage calculation was performed for a previous version of the incoming code change is based on a code change identifier associated with both the incoming code change and the previous version of the incoming code change.

13. The system of claim 11, wherein the determination that the incoming code change differs from the previous version of the code change is based on a comparison of a snapshot of the incoming code change to a snapshot of the previous version of the code change.

14. The system of claim 11, wherein the one or more processors are caused to perform further operations comprising:
comparing a snapshot of the incoming code change to a snapshot of the previous version of the code change; and
determining, based on the comparison, that the incoming code change differs from the previous version of the code change in at least one of the following ways: one or more new tests have been added to the code change; one or more tests have been removed from the code change; more than a threshold amount of new code, other than test code, has been added to the code change; and more than a threshold amount of code, other than test code, has been removed from the code change.

15. The system of claim 9, wherein the one or more processors are caused to perform further operations comprising:
posting a notification in a notification area of a user interface screen associated with the code review service, wherein the posted notification is accessible by the at least one recipient associated with the code change.

16. The system of claim 9, wherein the one or more processors are caused to perform further operations comprising:
prior to detecting the incoming code change, receiving a request for updated test coverage calculations for a code change already submitted to the code review service; and
performing one or more updated test coverage calculations for the already submitted code change in response to the request.

17. One or more non-transitory computer readable media storing computer-executable instructions that, when executed by one or more processors, causes the one or more processors to perform operations comprising:
monitoring a code review system for notifications about changes in a code client;
detecting an incoming code change to the code review system based on a received notification about a change in the code client;
determining an extent to which the incoming code change has been modified from a previous version of the incoming code change previously submitted to the code review system;
in response to the determined extent of the modification satisfying a threshold, performing one or more test coverage calculations for the incoming code change;
in response to the extent of the modification not satisfying the threshold, maintaining a test coverage calculation performed for the previous version of the incoming code change previously submitted to the code review system;
generating test coverage data for the incoming code change based on the one or more test coverage calculations performed or the test coverage calculation performed for the previous version of the incoming code change; and
sending a notification of the generated test coverage data generated for the code change to at least one recipient associated with the code change.

18. The one or more non-transitory computer readable media of claim 17, wherein the one or more processors are caused to perform further operations comprising:
determining that a test coverage calculation was performed for the previous version of the incoming code change; and
performing one or more updated test coverage calculations for the incoming code change based on a determination that the incoming code change differs from the previous version of the code change.

\* \* \* \* \*